April 12, 1949.    M. C. HAMBY    2,466,702
AUTOMATIC PILOT ENGAGING MEANS
Filed Nov. 28, 1944    4 Sheets-Sheet 1

INVENTOR.
MALCOLM C. HAMBY
BY
ATTORNEYS

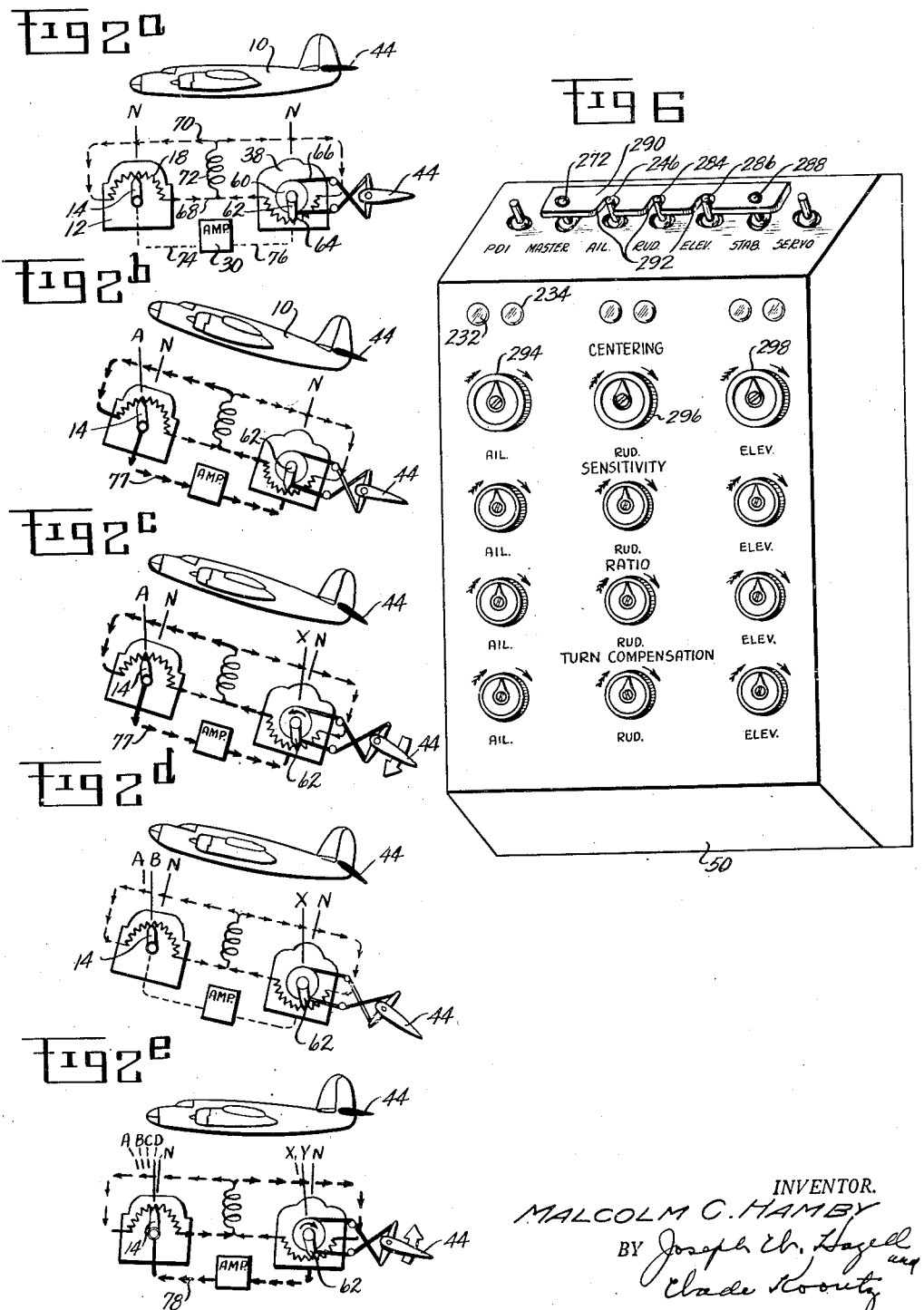

April 12, 1949.　　　　M. C. HAMBY　　　　2,466,702
AUTOMATIC PILOT ENGAGING MEANS
Filed Nov. 28, 1944　　　　　　　　　　4 Sheets-Sheet 3
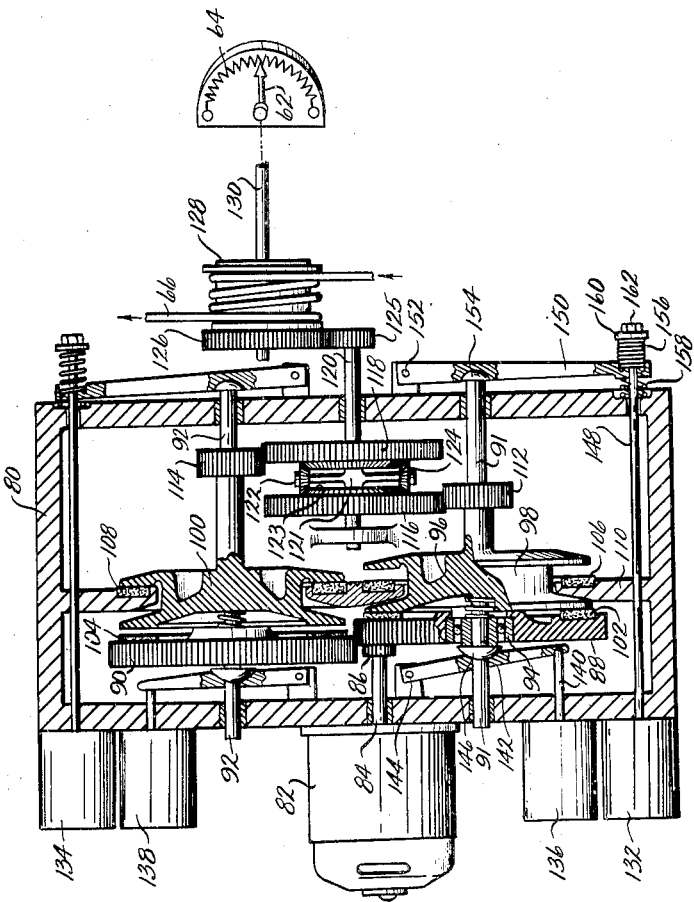
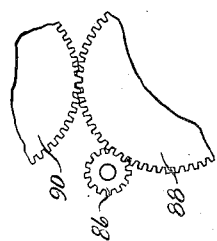
INVENTOR.
MALCOLM C. HAMBY
BY Joseph Th. Hazell
and
Clade Koontz
ATTORNEYS

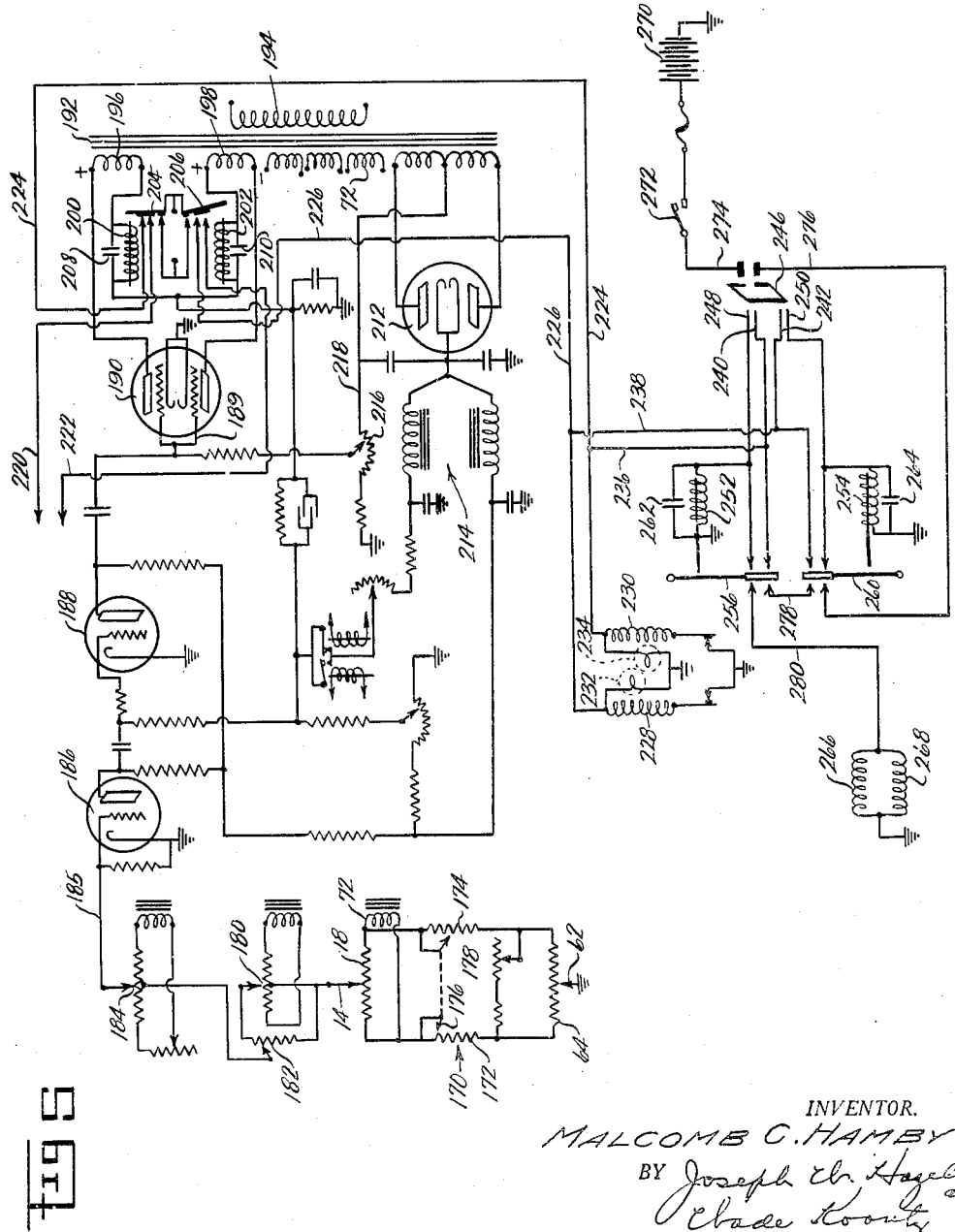

Patented Apr. 12, 1949

2,466,702

UNITED STATES PATENT OFFICE 2,466,702

AUTOMATIC PILOT ENGAGING MEANS

Malcolm C. Hamby, United States Army

Application November 28, 1944, Serial No. 565,564

4 Claims. (Cl. 244—77)

(Granted under the act of March 3, 1883, as amended April 30, 1928; 370 O. G. 757)

The invention described herein may be manufactured and used by or for the Government for governmental purposes, without payment to me of any royalty thereon.

This invention relates to improvements in automatic pilot mechanisms for aircraft and more particularly to an automatic safety engagement unit for use with the electronic type of automatic pilot currently being used by the U. S. Army Air Forces for controlling the flight of its larger types of aircraft such as bombers, transports, cargo planes, etc.

As the result of considerable operating experience it has been found that the above-mentioned type of automatic pilot is subject to the disadvantage that when the human pilot of the aircraft undertakes to place his craft under the control of the automatic pilot, he must rely upon certain visual indications in order to ascertain when conditions are correct for the engagement of the robot control. The procedure with the present apparatus is for the pilot to mechanically "trim" the aircraft for straight and level flight after which he adjusts the centering control knobs on the autopilot control panel until the tell-tale lights on the panel go out. The autopilot is then ready for engagement and, after being engaged, will take over control of the aircraft and hold it "on course." If the autopilot should be accidentally engaged before the tell-tale lights are put out, or should any of the lights be burned out so as to erroneously indicate a balanced condition of the autopilot mechanism when in fact such condition does not exist, subsequent engagement of the autopilot may cause a serious upset of the aircraft and thereby endanger the welfare of the craft and its crew.

The present invention is designed to eliminate this possibility by providing automatic means for causing the autopilot to be engaged only at such times as the autopilot circuits are balanced and conditions are correct for the engagement of the robot control. In this way, any possibility of accidental upset of the aircraft resulting from improper engagement of the autopilot is avoided and, in addition, the procedure of engaging the autopilot is considerably simplified.

Accordingly, it is an object of the present invention to provide means for causing the above-mentioned type of automatic pilot to be automatically engaged when the bridge circuits thereof are brought into balance.

Another object of the invention is to provide an automatic engagement unit for the above-mentioned type of automatic pilot in which the engagement of the same is delayed by the holding circuits of certain relays until the bridge circuits are balanced after which the pilot is automatically engaged without further attention on the part of the operator.

A further object of the invention resides in the provision of an automatic pilot engagement device for the above-mentioned type of autopilot which includes a double-throw relay connected with each of the operating solenoid circuits, a holding circuit for each of the relays, and a switch operative to break the connection between each relay and its associated operating solenoid circuit and to cause a circuit to be completed through the brake solenoids when the holding circuits are deenergized.

Still a further object of the invention resides in the provision of an interlock on the control panel of the above-mentioned type of automatic pilot for preventing the engaging switches from being turned on until after the master switch has been moved to its "on" position.

With the above and other objects in view the present invention will now be described in connection with the accompanying drawings which illustrate a preferred embodiment of the invention, it being evident, however, that other arrangements and forms of construction may be resorted to in carrying out the spirit of the invention.

In the drawings:

Figs. 2a, 2b, 2c, 2d and 2e are a series of diagrammatic views illustrating the principle of operation of the automatic pilot.

Fig. 3 is a schematic sectional elevation of one of the servomotors shown in Fig. 1

Fig. 4 is a fragmentary view of a portion of the mechanism shown in Fig. 3.

Fig. 5 shows the wiring diagram of the automatic pilot control circuit for the aileron axis as well as the novel automatic engaging circuit which forms the subject matter of the present invention.

Fig. 6 is a schematic view of the pilot's control panel showing the interlock provided between the master switch and the engaging switches.

Figure 1:
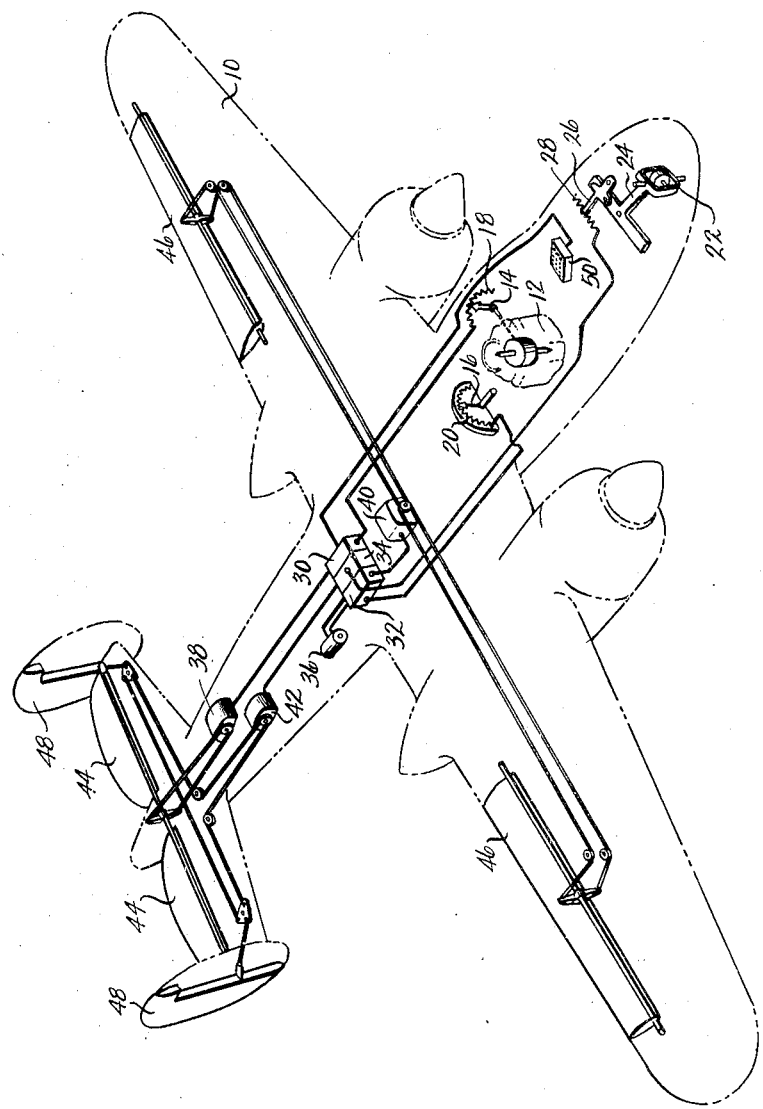
Fig. 1 is a schematic view showing the complete automatic pilot mechanism installed on an aircraft.

Figure 1 of the drawings shows in phantom outline an airplane 10 which is provided with an automatic pilot of the electronic type which is currently being used by the Army Air Forces for controlling the flight of its larger types of aircraft. As shown in solid outline, the automatic pilot comprises a vertical gyroscope 12, having the customary inner and outer gimbal rings (not shown) to which are attached potentiometer wipers 14 and 16, respectively, which cooperate with potentiometer windings 18 and 20, respectively, secured to the case of the gyroscope. Hence, as the airplane moves about its pitch and roll axes the wipers 14 and 16 will move across their respective windings 18 and 20, thereby changing the resistance ratios between the two halves of the potentiometer windings. In the nose of the airplane 10 is located a horizontal or directional gyroscope 22 having a bracket 24 rigidly secured to the gimbal ring of the gyroscope. Secured to the bracket 24 is a potentiometer wiper 26 which cooperates with a potentiometer winding 28. Hence, if the airplane changes its directional heading, the wiper 26 will move across the winding 28 to change the resistance ratio between the two halves of the potentiometer winding. The potentiometer windings 18, 20 and 28 are operatively connected with amplifiers 30, 32 and 34, it being understood that the connecting lines shown between the potentiometer windings and the amplifiers do not represent wires but rather serve to illustrate in a schematic manner the connection between related units. A rotary inverter 36 is provided for converting the direct current from the airplane's battery into alternating current which is used as a source of power for the amplifiers. The amplifiers 30, 32 and 34 are connected with servo units 38, 40 and 42, respectively. Here again the connecting lines shown between the amplifiers and servo units do not represent wires but rather serve to show the connection between the related units in a schematic manner. Each of the servo units is connected with one set of control elements of the airplane by means of suitable control cables. As shown in the drawing, the servo unit 38 is operatively connected with the elevators 44, the servo unit 40 is connected with the ailerons 46, and the servo unit 42 is connected with the rudders 48. An automatic pilot control panel 50 is provided in the pilot's compartment of the aircraft so as to enable the pilot to control the operation of the automatic pilot in the manner desired.

The principle of operation of the automatic pilot is illustrated in Figures 2a to 2e inclusive. These figures illustrate in a schematic manner the interaction between the vertical flight gyro 12, the amplifier 30, and the servo unit 38 resulting from a deviation of the airplane about its pitch axis. It will be understood that the automatic pilot operates in a similar way to correct deviations about the roll and turn axes. These diagrams serve to illustrate how deviations of the airplane cause the flight gyro to unbalance a bridge circuit and how the servo unit rebalances the circuit by following the gyro movements.

As shown in Figure 2a the servo unit 38 is provided with a cable drum 60 to which is secured a potentiometer wiper 62. This wiper cooperates with a potentiometer winding 64 fastened to the case of the servo unit. Hence, any movement of the cable drum 60 will serve not only to operate the elevator 44 of the airplane by means of a cable 66, but will also move the wiper 62 along the potentiometer winding 64. As shown in the figure, one end of the potentiometer winding 18 is connected by means of a conductor 68 with one end of the potentiometer winding 64. Similarly, the two remaining ends of the potentiometer windings 18 and 64 are connected with one another by means of a conductor 70. The conductors 68 and 70 are in turn joined together by a transformer secondary winding 72 which provides a source of alternating E. M. F. across opposite corners of the resulting bridge circuit. The remaining two corners of the bridge circuit, represented by the wipers 14 and 62, are connected to the amplifier 30 by means of conductors 74 and 76. As shown in Figure 2a, the airplane 10 is trimmed for straight and level flight with its elevator 44 in its normal position. The wipers 14 and 62 are electrically centered on their respective windings 18 and 64 and the bridge circuit is accordingly in a balanced condition with no current flowing through the amplifier 30. Fig. 2b illustrates the attitude of the aircraft after a sudden current of air has raised the nose of the aircraft so as to cause a deviation about the pitch axis. The gyro case 12 and its attached potentiometer winding 18 tilt with the airplane, thus causing movement of the potentiometer wiper along the winding to a position A. This movement of the wiper unbalances the bridge circuit and thus causes current to flow through the amplifier in the direction shown by heavy arrows 77 in Fig. 2b. Thus causes a "down elevator" relay in the amplifier to be closed, thereby sending a "down elevator" signal to the elevator servo unit. As shown in Fig. 2c, the servo unit has commenced to operate the cable drum so as to depress the elevator 44, and at the same time has caused the wiper 62 to move to a position X. While the wiper 62 has been moved in a direction tending to balance the bridge circuit, the extent to which it has moved is insufficient to bring about complete balance of the circuit and current still flows through the amplifier in the direction shown by the heavy arrows 77. However, as soon as the servo unit begins to apply "down elevator," the airplane begins to level off and the potentiometer wiper 14 in the vertical flight gyro begins to return to its normal position. It will be observed that at some intermediate position (see Fig. 2d) the bridge circuit will again be balanced since the wipers 14 and 62 are then in positions B and X, respectively, and are again parallel. At this point the servo unit will cease operating since sufficient "down elevator" has been applied to produce the required correction and the servo unit is no longer receiving any signal from the amplifier due to the balanced condition of the bridge circuit. It is now necessary to reverse the direction of movement of the control surface in order to prevent "over control." As shown in Fig. 2e, this reversal will take place by virtue of the fact that the wiper 14 will move away from the position B toward its normal or centered position, thereby causing an unbalance of the bridge circuit in the opposite direction so as to cause current to flow through the amplifier in the direction of the heavy arrows 78. The amplifier will accordingly send a signal to the servo unit calling for operation in the reverse direction so as to bring the elevator 44 back toward neutral position. In so doing, the wiper 62 will be moved to position Y, but by this time the wiper 14 in the vertical flight gyro will have moved to a new position such as D, so that the bridge circuit still remains unbalanced and the amplifier will continue the signal for "up elevator" until the elevator has returned to its neutral position and the airplane is again flying a level course. In order to prevent hunting of the aircraft about its level line of flight, means is provided in the amplifier for causing the signal which is transmitted to the servo unit to be proportional to the extent of unbalance in the bridge circuit. Inasmuch, however, as the present invention is not concerned with this feature of the automatic pilot, it will be unnecessary to describe herein the manner in which this proportionalizing type of control is effected.

The three servo units 38, 40 and 42 shown in Fig. 1 are illustrated in greater detail in Figure 3 where one of the units is shown in cross section. As shown in this figure, each of the units consists essentially of a casing 80, to one wall of which is secured an electric motor 82, whose shaft 84 projects through the wall of the casing and into the interior thereof. On the end of the motor shaft 84 is secured a small pinion gear 86, which meshes with a gear wheel 88, which in turn meshes with an identical gear wheel 90. Details of this gearing arrangement are shown more clearly in Figure 4 of the drawings. The gear wheels 88 and 90 are supported on shafts 91 and 92 which extend clear through the casing 80 and are supported at each end in bearings mounted in the walls of the casing. The gear wheels 88 and 90 are mounted for rotation on the shafts 91 and 92 by means of ball bearings 94 (only one shown) and are also free to move longitudinally along their respective shafts by virtue of a sliding fit provided between the inner races of the ball bearings and the shafts. The gear wheels are normally urged toward the left, as viewed in Fig. 3, by means of helical compression springs 96 which bear at one end against the inner races of the ball bearings 94 and at the other end against the faces of drums 98 and 100. An annular friction ring 102, constructed of cork or other suitable friction material, is secured to the right-hand face of the gear wheel 88 and is adapted, under certain conditions later to be described, to engage with the left-hand brake surface provided in the drum 98 to thereby cause the latter to rotate with the wheel 88. A similar friction ring 104 is provided on the wheel 90 for a similar purpose with respect to drum 100. A second pair of friction rings 106 and 108 are mounted in the partition wall 110 provided within the casing 80. These friction rings are adapted, under certain conditions to engage the right-hand braking surfaces on the drums 98 and 100 so as to prevent rotation of the drums. The drums 98 and 100 are secured to the shafts 91 and 92, respectively, as are also the pinion gears 112 and 114, respectively, which mesh with gear wheels 116 and 118 which are rotatably mounted upon a shaft 120. This shaft is rotatably supported in the casing 80 and has fixedly secured thereto a differential spider 121 which carries a plurality of bevel gears 122 at the outer ends of its arms. The bevel gears 122 are in meshing engagement with a pair of larger bevel gears 123, 124 secured to the inner faces of the gears 116 and 118, respectively. This arrangement constitutes a well-known form of mechanical differential which functions in a manner to be described hereinafter. Secured to the outer end of the shaft 120 is a pinion gear 125 which meshes with the gear wheel 126 fast on the shaft 130 which may be rotatably supported in the framework of the servo unit in any suitable manner. A cable drum 128 is secured to the gear wheel 126 and the cable 66, which was illustrated in Fig. 2a for operating the elevator control surfaces 44, is passed several times about the drum 128, after which its ends are connected to horns provided on the control surfaces. Also secured to the shaft 130 is the potentiometer wiper 62, before referred to in connection with Figure 2a, while the potentiometer winding 64 is secured in any suitable manner to the framework of the servo unit.

The operation of the servo unit is controlled by means of a pair of brake solenoids 132 and 134, and also by a pair of operating solenoids 136 and 138 all of which are securely mounted on the outside of the casing 80. Inasmuch as the brake solenoid 134 and the operating solenoid 138 control the operation of the gear wheel 90 and the drum 100 in identically the same manner as the brake solenoid 132 and the operating solenoid 136 control the operation of the gear wheel 88 and the drum 98, only the latter two solenoids, together with their related parts will be described herein. As shown in Figure 3, the operating solenoid 136 is provided with an armature 140 which projects through the wall of the casing 80 where it cooperates with the end of a lever 142 pivotally mounted in the casing at 144. This lever is provided with an aperture through which the shaft 91 passes. The right-hand surface of the lever adjacent to the aperture is provided with a hemispherical recess which receives a hemispherical abutment 146, which is fastened to the inner ball race of the bearing 94. When the solenoid 136 is energized, the armature 140 is moved toward the right so as to cause the gear 88 to be moved to the right along the shaft 91. This causes the spring 96 to be compressed and friction ring 102 to be pressed against the left-hand braking surface of the drum 98 so as to cause the drum to revolve with the gear.

The brake solenoid 132 is provided with an armature rod 148 which passes through the casing 80 and extends a short distance beyond the right-hand wall thereof. The right-hand end of the rod 148 cooperates with a lever 150 which is pivotally mounted on the outside of the casing 152. The free end of the lever 150 is provided with an aperture for receiving the end of the rod 148 and is connected with the rod through the medium of two compression springs 156 and 158. The spring 158 is compressed btween the wall of the casing 80 and the left hand face of the lever 150 while the spring 156 is compressed between the right-hand face of the lever and a washer 160 which is retained on the end of the rod 148 by means of a nut 162. About midway along its length, the lever 150 is provided with a hemispherical recess for receiving a hemispherical button 154 provided on the right-hand end of the shaft 91. When the brake solenoid 132 is energized, the rod 148 is moved toward the left so as to cause the shaft 91 to be moved toward the left thereby causing the right-hand braking surface of the drum 98 to be moved into engagement with the friction ring 106 mounted in the partition wall 110.

In the normal operation of the automatic pilot the brake solenoids are first energized so as to cause the rods 148 to be moved to the left thereby yieldably urging the shafts 91 and 92 toward the left. This results in the drums 98 and 100 being braked by reason of this engagement with the friction rings 106 and 108, respectively. This effectively locks each of the drums against rotation until one of the operating solenoids is energized. As shown in Figure 3, the brake solenoids 132 and 134 have been energized so as to brake the drums 98 and 100. Moreover, the operating solenoid 136 has been energized to move the ring gear 88 and its friction ring 102 into engagement with the drum 98 and at the same time to move the drum and the shaft 91 to the right against the force of the spring 156 so as to disengage the drum from the friction ring 106 and cause it to rotate with the gear 88. Inasmuch as the drum 100 is in engagement with the friction ring 108 and thereby held against movement, the differential gear 118 will be held stationary while the gear 116 will be rotated by the pinion 112. This will cause the shaft 120 and the cable drum 128 to be rotated in one direction. Obviously, if the operating solenoid 138 were to be energized instead of the solenoid 136, the direction of rotation of the cable drum would then be in the reverse direction. If either of the operating solenoids should accidentally be energized prior to the energization of the brake solenoids, this would be ineffective to cause rotation of the cable drum inasmuch as neither of the differential gears 116 or 118 would then be held stationary and the shaft 120 of the differential would remain at rest.

In Figure 5 is shown the wiring diagram of the aileron control unit of the automatic pilot. In the left-hand portion of this figure is shown a bridge circuit comprised of potentiometer windings 18 and 64, potentiometer wipers 14 and 62, and transformer secondary winding 72. A centering device, indicated generally at 170, is provided in conjunction with the bridge circuit for enabling the electrical center of the potentiometer winding 64 to be adjusted at will. This device consists of the potentiometer windings 172 and 174 which are serially inserted between the ends of the potentiometer windings 18 and 64. Potentiometer wipers 176 and 178 cooperate with the windings 172 and 174, respectively, and are arranged to be simultaneously rotated in opposite directions from a common shaft. As shown in the diagram, each of the wipers is electrically connected to one end of its associated potentiometer winding so as to serve as a rheostat for inserting more or less resistance into the arms of the bridge. For example, when the potentiometer shaft is turned in one direction the wiper 176 will be moved upward as shown in the diagram to thereby increase the resistance on the left-hand end of the winding 64, while the wiper 178 will be moved downward so as to decrease the resistance on the left-hand end of the winding. This will result in shifting the electrical center of the potentiometer 64 for a purpose to be disclosed hereinafter. Any unbalance in the bridge circuit will be transmitted from the wiper 14 through the potentiometers 180, 182 and 184 to the grid lead 185 of the vacuum tube 186. The signal applied to the grid of the tube 186 will be amplified and passed on to the grid of a second tube 188 where it will be further amplified and applied to the two grids 189 of a twin triode type of vacuum tube 190. The grids of the tube 190 are supplied with an alternating E. M. F. derived from the transformer 192 which has a primary winding 194 and a series of secondary windings including windings 196 and 198. The windings of the secondaries 196 and 198 are so connected to the plates of the tube 190 as to cause the same to be phased 180 electrical degrees apart. As shown by the positive and negative signs applied to the windings 196 and 198 in the drawing, when the upper plate of the tube is positive, the lower plate of the tube will be negative, and vice versa. A relay 200 is inserted in the plate-cathode circuit of one section of the tube while a relay 202 is inserted in the plate-cathode circuit of the other section of the tube. The relays 200 and 202 are provided with armatures 204 and 206, respectively, which serve to control the operating solenoids of the aileron servo unit in a manner which will be later described. The coils of the relays 200 and 202 are shunted by large condensers 208 and 210 for the purpose of holding in the armatures of the relays during alternate half-cycles when the particular section of the tube 190 is in a nonconducting condition. It will be observed that the secondary winding 72 which serves to energize the bridge circuit shown in the left-hand portion of Figure 5 is one of the secondary windings on the transformer 192. Hence, if the bridge circuit is unbalanced in one direction, the upper plate of the tube 190 will go positive at the same time that the grids 189 go positive, whereas if the bridge is unbalanced in the opposite direction, the lower plate of the tube 190 will go positive at the same time that the grids 189 go positive. In other words the relay 200 will be energized when the bridge is unbalanced in one direction, whereas the relay 202 will be energized when the bridge is unbalanced in the opposite direction, thus giving an indication of the direction in which the control should be applied to bring the aircraft back to level flight. Since the grids 189 of the tube 190 are biased almost to the point of cut-off, neither of the sections of the tube 190 will be in a conducting condition when the grids are driven in a negative direction by the signal from the bridge. In order to hold in the armature of the relay during the alternate half-cycles when the grids 189 go negative, the condensers 208 and 210 are shunted across the relay windings, these condensers serving to discharge the electrical energy accumulated during the conducting half-cycle through the relay coils during the nonconducting half-cycle. Thus, the relay armatures 204 and 206 will be prevented from chattering as a result of the intermittent action of the tube. A full-wave rectifier tube 212, together with a filter 214, provides a source of plate voltage for the amplifier tubes 186 and 188 and also provides a source of bias voltage for the grids 189 of the tube 190 by means of a potentiometer 216 inserted in the negative lead 218 of the rectifier.

Direct current for energizing the operating solenoids of the aileron servo unit is supplied to the conductors 220 and 222 from any suitable source, such as the airplane's battery. Each of these conductors is connected to one of the contacts on the relays 200 and 202, respectively. Conductors 224 and 226 are connected to a second set of contacts on the relays and serve to conduct the direct current from the conductors 220 and 222 to the solenoid windings 228 and 230 of the two operating solenoids of the aileron servo unit whenever the relays are energized. A pair of tell-tale lights 232 and 234 are also connected between the conductors 224 and 226 and ground so as to provide a visual indication of the energization of the operating solenoids. A pair of conductors 236 and 238 are connected to conductors 224 and 226 and also to a pair of switch terminals 240 and 242, respectively. A double-throw switch 246 serves, when in its left-hand position as viewed in Figure 5, to connect the terminals 240 and 242 with a second pair of terminals 248 and 250, respectively, so as to connect the field windings 252 and 254 of a pair of relays with the conductors 224 and 226. The switch terminals 248 and 250 are each connected with one of the forward contacts of the relays 252 and 254 while the conductors 224 and 226 are connected with another of the forward contacts of the relays. Hence, if either of the relays are energized when the switch 246 is in its left-hand position, the relay will remain energized due to a holding circuit established through the forward contacts after the switch 246 is opened. The condensers 262 and 264 are shunted across the field windings 252 and 254 of the relays so as to reduce sparking at the forward contacts. When the switch 246 is moved to its right-hand position, a circuit is closed from a battery 270 through a master switch 272, a conductor 274 and a conductor 276. The latter conductor is connected to one of the back contacts of the relay 254, the other back contact of this relay being connected by means of a conductor 278 with one of the back contacts of the relay 252. The other back contact of relay 252 is connected by a conductor 280 with the windings of the brake solenoids 266 and 268. Accordingly, the brake solenoids can only be energized when both of the relay armatures 256 and 260 are in engagement with their back contacts.

In Figure 6 of the drawings is shown the autopilot control panel 50 which is located in the pilot's compartment of the aircraft. On the upper portion of the panel is located a series of switches including the master switch 272, the aileron engaging switch 246, a rudder engaging switch 284, an elevator engaging switch 286 and a stabilizer switch 288 which completes a power circuit to the directional gyromotor. The master switch 272 and the stabilizer switch 288 are interconnected by means of a bar 290, which is fastened to the upper ends of the levers of each of these switches. The bar 290 is provided with a series of notches 292 which receive the upper ends of the levers of the aileron, rudder and elevator-engaging switches when all of the switches 272, 246, 284, 286 and 288 are in their "off" positions. The bar 290 is moved upwardly to move the master switch and the stabilizer switch to their "on" positions, after which the aileron, rudder, and elevator switches may be moved to the left to their "on" positions. By virtue of this arrangement it is always necessary to move the master switch to its "on" position before the aileron, rudder, and elevator switches may be moved to their "on" positions. Also provided on the face of the control panel 50 are three centering dials 294, 296 and 298, which serve to electrically center the bridge circuits for the aileron, rudder and elevator axes of the aircraft in the manner described in connection with Figure 5. The telltale lights 232 and 234 for the aileron axis, as well as the tell-tale lights for the rudder and elevator axes, are also mounted on the control panel where they may be readily observed by the pilot.

*Operation*

Prior to the present invention the procedure for engaging the automatic pilot was as follows: The master switch 272 was first switched to its "on" position so as to energize the rotary inverter, the vertical flight gyro, the motors in all servo units, and the amplifier tube heaters. The aircraft then was trimmed by the pilot to fly a straight and level course, after which each of the centering dials 294, 296 and 298 were adjusted so as to cause all of the tell-tale lights on the panel to be extinguished. The aileron, rudder, and elevator-engaging switches were then moved to their "on" positions so as to energize the brake solenoids of all of the servo units. The automatic pilot was then engaged and would continue to direct the flight of the aircraft under the control of the vertical flight gyro and the directional gyro. According to the present invention, it is unnecessary for the pilot to rely upon the indications of the tell-tale lights in order to insure that the bridge circuits are balanced before engaging the automatic pilot by means of the switches 246, 284 and 286. Instead he may now, after turning on the master switch and leveling off the aircraft, proceed to turn on the aileron, rudder, and elevator-engaging switches. As shown in Figure 5, if any of the bridge circuits are unbalanced, one of the two relays 252 or 254 will be energized and cause the armature thereof to be pulled against the forward contacts. When the switch 246 is now moved from its left-hand or "off" position to its right-hand or "on" position, the brake solenoids 266 and 268 will not be energized since the armature of the energized relay will be held against the forward contacts by virtue of the holding circuit therethrough, thus breaking the circuit from the battery 270 to the windings of the brake solenoids. Hence, the controls can not inadvertently be driven in even though the engaging switches be moved to their "on" positions before the bridge circuits are balanced. After turning on the engaging switches, pilot then adjusts the centering dials for each of the three axes until the bridge circuits are balanced whereupon the brake solenoids will be energized due to the deenergization of the relay winding 252 or 254, thereby allowing the relay armature to fall against the back contacts and complete the circuit from the battery 270 to the brake solenoid windings 266 and 268.

It is necessary for the proper operation of the novel engaging means described herein that the master switch be closed prior to the closing of the engaging switches since the relays 252 and 254 can not be energized by reason of an unbalanced bridge circuit if the engaging switch 246 is in its left-hand or "on" position prior to the energization of the bridges and amplifiers. In order to insure that the master switch shall always be turned "on" before any of the engaging switches are switched "on," the bar 290 extending between the switches 272 and 288 is provided with notches 292 for accommodating the engaging switch levers when the switches are all in their "off" positions. The engaging switches can thus be moved to the left to their "on" positions only after the bar 290 has been pushed upward to turn on the master switch.

From the above description of my invention, it will be seen that I have devised a simple and effective means for preventing the automatic pilot controls from accidentally being driven in with the bridges in an unbalanced condition. As mentioned earlier in the present description, the accidental engagement of the automatic pilot when the bridges are unbalanced may result in a serious accident to the aircraft and its crew by reason of the violent control effect caused by an unexpected operation of the aircraft control surfaces due to the unbalanced condition of one or more of the bridge circuits. However, with the above-described automatic engaging means, it is no longer necessary for the pilot to rely upon the visual indications of the tell-tale lights in order to determine when conditions are correct for the engagement of the automatic pilot. With the present device it is only necessary for the pilot to turn on the engaging switches after which the centering dials on the control panel are adjusted until the control "snap" in. Hence, the engagement of the automatic pilot is rendered safe and convenient and all uncertainty as to the proper time to engage the controls is eliminated.

I claim:

1. In an aircraft having a plurality of elements for controlling the flight of the aircraft and an automatic pilot for operating said elements, said automatic pilot including a servo unit disengageably connected with each of said elements, a position reference means associated with each of said elements, a bridge circuit so connected with each of said reference means as to be balanced when said aircraft is following a prescribed course and unbalanced when said aircraft deviates from said course, and means connected with each of said bridge circuits for controlling the operation of said servo units; the combination of manipulative means for enabling each of said bridge circuits to be balanced while the aircraft is following the prescribed course, means responsive to an unbalanced condition of each bridge circuit for establishing a holding circuit to maintain the associated servo unit disengaged from operative connection to actuate its associated aircraft control element and means operative upon breaking of each holding circuit due to attainment of a balanced bridge condition for causing each of said servo units to be engaged with its associated aircraft control element.

2. In an aircraft having a plurality of elements for controlling the flight of the aircraft and an automatic pilot for operating said elements, said automatic pilot including a servo unit having means for disengageably connecting the same with each of said elements, a position reference means associated with each of said elements, a bridge circuit so connected with each of said reference means as to be balanced when said aircraft is following a prescribed course and unbalanced when said aircraft deviates from said course, and means connected with each of said bridge circuits for controlling the operation of said servo units; the combination of manipulative means for enabling each of said bridge circuits to be balanced while the aircraft is following the prescribed course, means in addition to said servo unit central means for sensing the balanced condition of each of said bridge circuits, and means controlled by each of said sensing means for rendering operative the means for causing said servo units to be engaged with their associated elements when their bridge circuits are balanced.

3. In an aircraft having at least one element for controlling the flight of the aircraft and an automatic pilot for operating said element, said automatic pilot including a servo unit associated with said element, electromagnetic means for engaging said servo unit with said element, a gyroscopic position reference means, a bridge circuit operatively connected with said reference means, manipulative means for enabling said bridge circuit to be balanced while the aircraft is following a prescribed flight path, said reference means being adapted to cause said bridge circuit to become unbalanced when the aircraft deviates from the prescribed flight path, a pair of electric circuits, and means connected with said bridge circuit for causing one of said circuits to be energized when said bridge circuit is unbalanced in one sense and the other of said circuits to be energized when said bridge circuit is unbalanced in the opposite sense; the combination of a relay associated with each of said circuits, each of said relays being provided with front and back contacts, means for serially connecting the back contacts of said relays with said electromagnetic engaging means, a double-throw switch operable in one position to connect each of said relays with its associated circuit and in the other position to connect said current source with said serial connecting means, and means connected with the forward contacts of each relay for establishing an auxiliary circuit between the relay and its associated circuit when the relay is energized to thereby prevent said electromagnetic engaging means from being energized when said switch is in said other position until said bridge circuit is brought into balance by said manipulative means.

4. In an aircraft having at least one element for controlling the flight of the aircraft and an automatic pilot for operating said element, said automatic pilot including a servo unit associated with said element, electromagnetic means for engaging said servo unit with said element, a gyroscopic position reference means, a bridge circuit operatively connected with said reference means, manipulative means for enabling said bridge circuit to be balanced while the aircraft is following a prescribed flight path, said reference means being adapted to cause said bridge circuit to become unbalanced when the aircraft deviates from the prescribed flight path, a pair of electric circuits, and means connected with said bridge circuit for causing one of said circuits to be energized when said bridge circuit is unbalanced in one sense and the other of said circuits to be energized when said bridge circuit is unbalanced in the opposite sense; the combination of a first relay associated with one of said circuits and a second relay associated with the other of said circuits, each of said relays having a pair of front contacts and a pair of back contacts, one of the back contacts on said first relay being connected with one of the back contacts on said second relay, and a second back contact on said first relay being connected with said electromagnetic engaging means, a source of current for energizing said electromagnetic engaging means, a double-throw switch operable in one position to connect each of said relays with its associated circuit and in the other position to connect said current source with the second back contact on said second relay, and means connected with the forward contacts of each relay for establishing an auxiliary circuit between the relay and its associated circuit when the relay is energized to thereby prevent said electromagnetic engaging means from being energized when said switch is in said other position until said bridge circuit is brought into balance by said manipulative means.

MALCOLM C. HAMBY.

REFERENCES CITED

The following references are of record in the file of this patent:

UNITED STATES PATENTS

| Number | Name | Date |
|---|---|---|
| 729,134 | Clark | May 26, 1903 |
| 931,148 | Schairer | Aug. 17, 1909 |
| 1,918,082 | Carlson | July 11, 1933 |
| 2,005,530 | Boykow | June 18, 1935 |
| 2,069,214 | Carlson | Feb. 2, 1937 |
| 2,139,878 | Carlson | Dec. 13, 1938 |
| 2,159,142 | Fischer | May 23, 1939 |
| 2,398,421 | Frische et al. | Apr. 16, 1946 |